Feb. 14, 1961 K. F. JOHNSON ET AL 2,971,418
APPARATUS HAVING A SHELL WITH TWO SPACED CUTTING EDGES
AND A HOLLOW RECIPROCATING CLOTTED MEMBER COOPERATING
THEREWITH FOR SHEARING METAL PARTS
Original Filed Dec. 11, 1953 5 Sheets-Sheet 1

INVENTORS:
K. F. JOHNSON
H. G. KOHR

BY C. B. Hamilton
ATT'Y

Feb. 14, 1961 K. F. JOHNSON ET AL 2,971,418
APPARATUS HAVING A SHELL WITH TWO SPACED CUTTING EDGES
AND A HOLLOW RECIPROCATING CLOTTED MEMBER COOPERATING
THEREWITH FOR SHEARING METAL PARTS
Original Filed Dec. 11, 1953 5 Sheets-Sheet 3

INVENTORS:
K. F. JOHNSON
H. G. KOHR

BY C. B. Hamilton
ATT'Y

INVENTORS:
K. F. JOHNSON
H. G. KOHR

Feb. 14, 1961 K. F. JOHNSON ET AL 2,971,418
APPARATUS HAVING A SHELL WITH TWO SPACED CUTTING EDGES
AND A HOLLOW RECIPROCATING CLOTTED MEMBER COOPERATING
THEREWITH FOR SHEARING METAL PARTS
Original Filed Dec. 11, 1953 5 Sheets-Sheet 5

INVENTORS:
K. F. JOHNSON
H. G. KOHR
BY C. B. Hamilton
ATT'Y

United States Patent Office 2,971,418
Patented Feb. 14, 1961

2,971,418

APPARATUS HAVING A SHELL WITH TWO SPACED CUTTING EDGES AND A HOLLOW RECIPROCATING CLOTTED MEMBER COOPERATING THEREWITH FOR SHEARING METAL PARTS

Kenneth F. Johnson, Oaklawn, and Hilton G. Kohr, Chicago, Ill., assignors to Western Electric Company, Incorporated, New York, N.Y., a corporation of New York Continuation of application Ser. No. 397,561, Dec. 11, 1953. This application June 24, 1958, Ser. No. 744,891

3 Claims. (Cl. 83—580)

This invention relates to apparatus for shearing metal parts, and more particularly to apparatus for shearing the ends of aluminum wire and is a continuation of application Serial No. 397,561 filed December 11, 1953 by Kenneth F. Johnson and Hilton G. Kohr for "Apparatus for Coldwelding Metal Parts Together," which application is now abandoned.

In the use of continuously operable, high speed machines for processing wire, such as, for example, machines for covering strands or twisted wires, the wires are usually supplied from reels or coils of determined length, and it is essential to rapidly splice wires from new reels to the trailing end of the wires of exhausted reels without interrupting the operation of the machine. Resistance welding has been used in the past to join the ends of the wires together. However, this method has disadvantages in that it is time consuming, and also tends to weaken the tensile strength of the wires adjacent to the joint thereof.

An object of the invention is to provide new and improved apparatus for shearing metal parts.

Another object of the invention is to provide apparatus for shearing the ends of aluminum wires.

In an apparatus illustrating certain features of the invention, the end portions of a pair of wires to be joined together are cut off transversely, and the wires are gripped and forced against one another with sufficient pressure to form a strong weld therebetween, which forms a flash at the weld, and this flash may be pinched tightly adjacent to the wire so that the flash may be flexed off leaving the two lengths of wires joined by a weld of substantially the same diameter as that of the lengths of wire.

A complete understanding of the invention may be obtained from the following detailed description of an apparatus forming a specific embodiment thereof, when read in conjunction with the appended drawings, in which—

Figure 3:
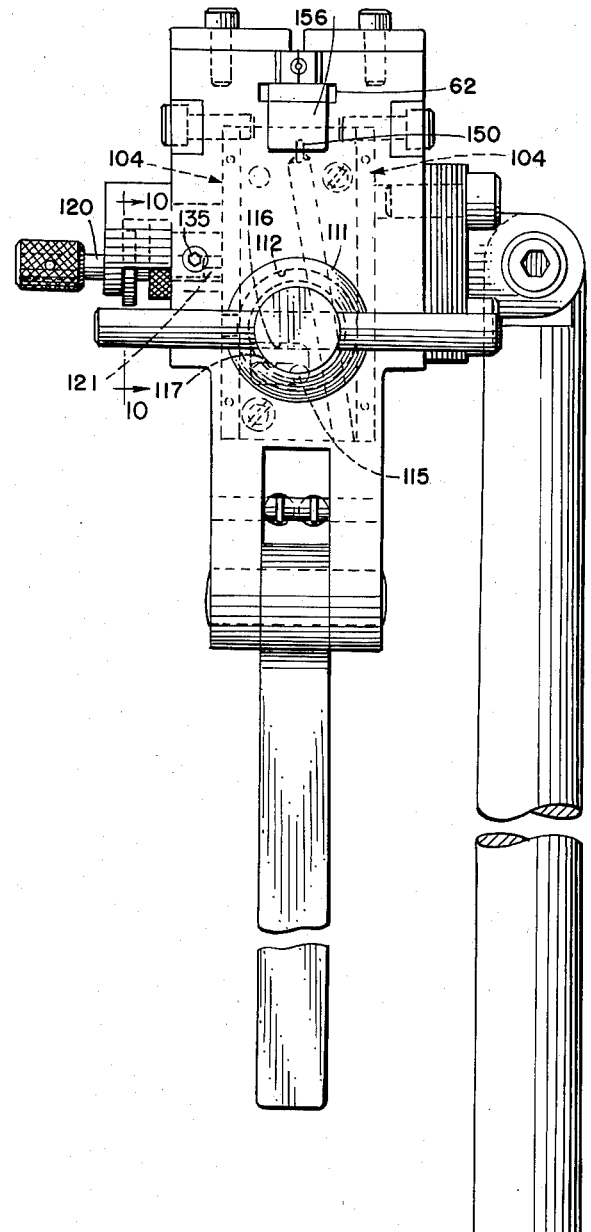
Fig. 3 is a side elevation of the apparatus shown in Fig. 1.
Figure 9:
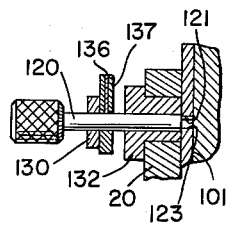
Figure 10:
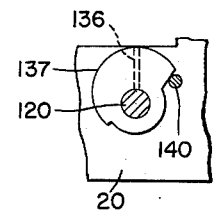
Figure 4:
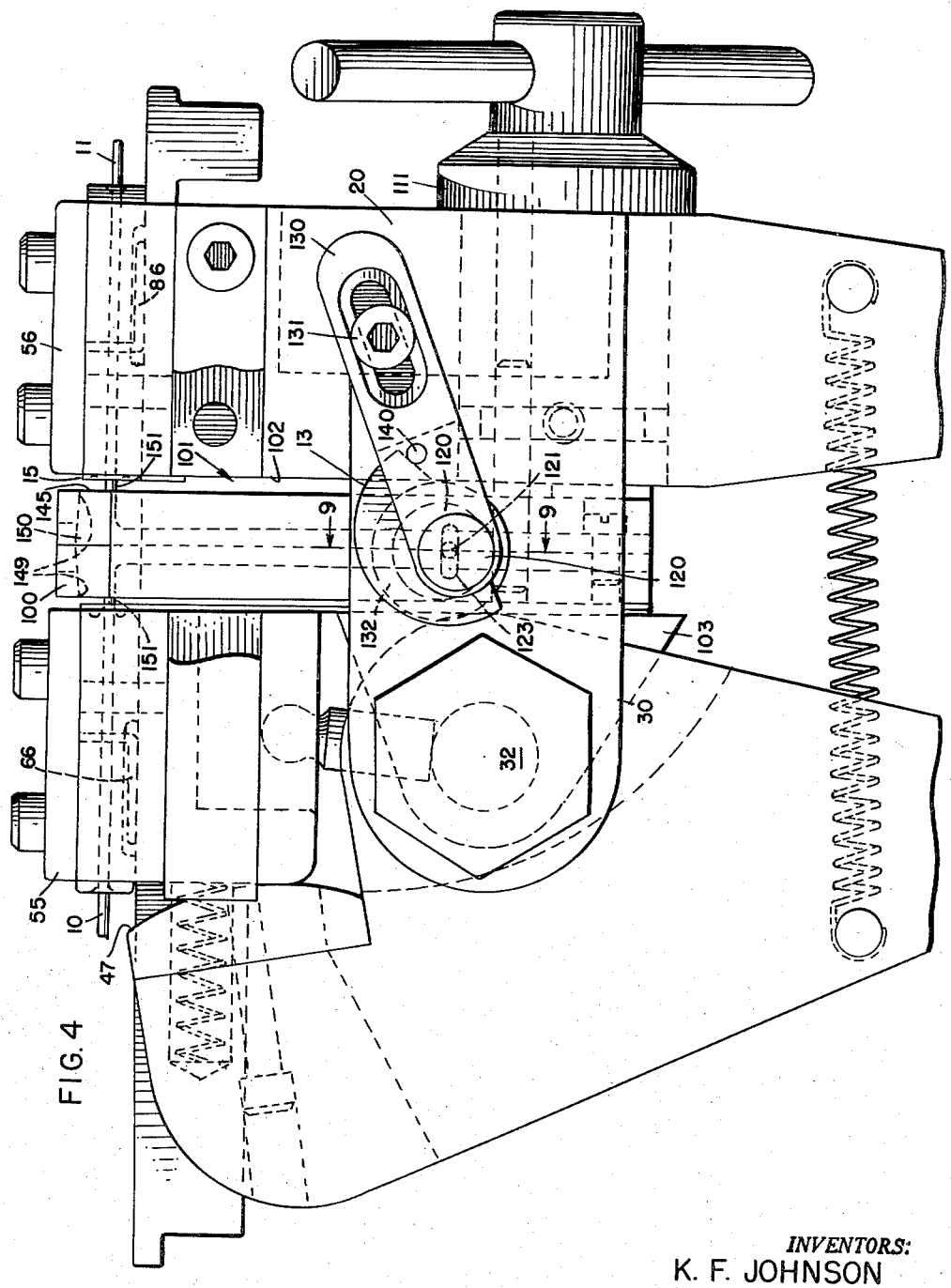
Fig. 4 is an enlarged, fragmentary partially sectional view of a portion of the apparatus shown in Fig. 1 moved to a different operating position from that illustrated in Fig. 1.

Fig. 9 is a fragmentary sectional view taken along line 9—9 of Fig. 4 showing shaft 120 and the cooperating structures; and Fig. 10 is a view taken along line 10—10 of Fig. 3, showing a cam in position limited by a pin.

Figure 5:
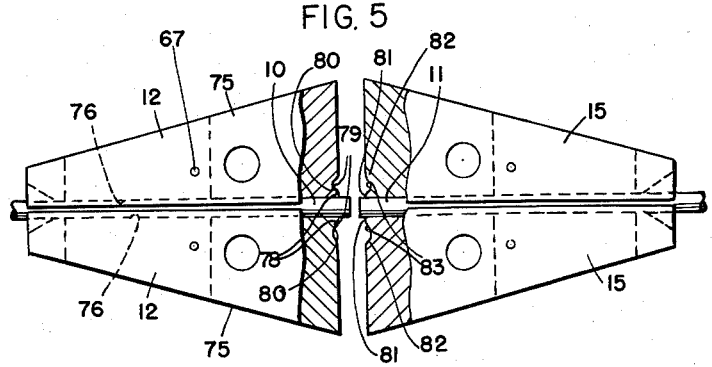
Fig. 5 is a large, fragmentary partially sectional view of a portion of the apparatus shown in Fig. 1 with the parts thereof shown in one position.
Figure 6:
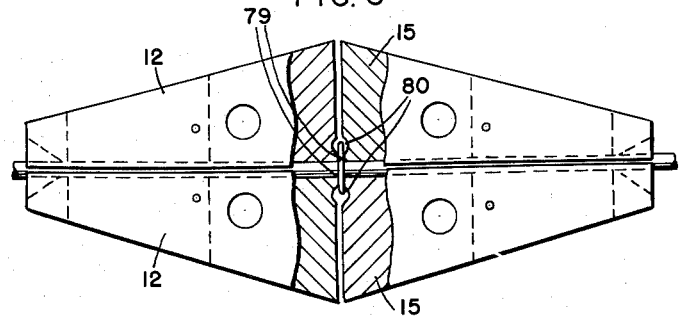
Fig. 6 is a view similar to Fig. 5 with the parts shown therein in a second position.
Figures 7, 8:
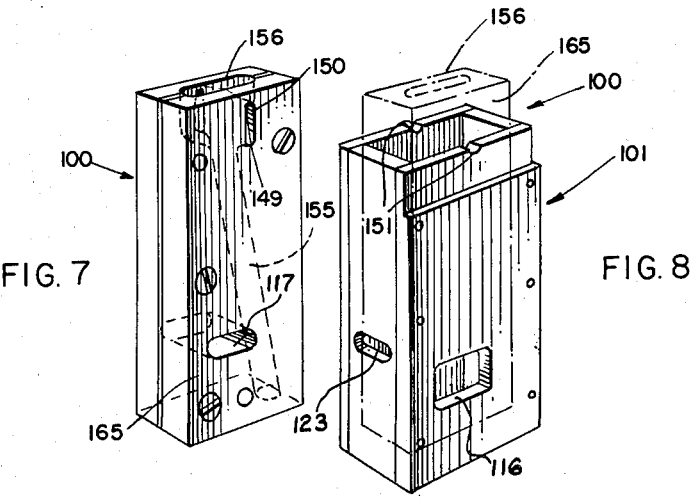
Fig. 7 is a perspective view of a portion of the apparatus.
Fig. 8 is an enlarged vertical section of a portion of the apparatus.

Referring now in detail to the drawings, there is shown therein an apparatus for shearing the end portions off of wires 10 and 11 (Figs. 4, 5 and 6) of annealed aluminum, annealed copper or other metal suitable for coldwelding, preparatory to coldwelding the wires together to form a welded joint that is as strong as the wires themselves. This apparatus includes wedge-shaped jaws 12 (Figs. 1 and 2) mounted slidably in a movable holder 13 for tightly gripping the wire 10, and wedge-shaped jaws 15 mounted slidably in a fixed holder 16 for gripping the wire 11 tightly.

The holder 16 forms a portion of a frame 20 adjustably mounted on a standard 21. The frame 20 includes arms 24 to which a hand-operated lever 25 is secured pivotally by a pin 26, and also includes arms 30 to which an actuating lever 31 is secured pivotally by a pin 32. A second hand-operated lever 35 is secured by a pin 36 pivotally to the hand-operated lever 25 to form a toggle-joint linkage therewith, and a pin 37 secured to the lever 35 to the actuating lever 31. Rigid guide bars 40 are secured by cap screws 41 in parallel positions projecting from grooves 42 in the frame 20, and the movable holder 13 is provided with guideways 45 to mount the holder 13 slidably on the guide bars 40 so that the holder 13 may be moved toward and away from the holder 16. When the hand-operated levers 25 and 35 are pressed toward one another, the lever 31 is swung in a clockwise direction, as viewed in Fig. 1, to force the holder 13 toward the right through plates 46 having hardened arcuate edges 47 and mounted integrally on the lever 31, the edges 47 serving to engage the holder 13. A pin 49 having a ball end portion 50 thereon projects into an opening 51 formed in the holder 13, and when the levers 25 and 35 are moved apart from one another, the ball end portion 50, after a slight lost motion, engages the holder 13 and moves it to the left, as viewed in Fig. 1.

Plates 55 (Fig. 2) secure the jaws 12 slidably in the holder 13, and plates 56 secure the jaws 15 in the holder 16. Portions of the jaws 12 rest on a hand-operated slide 60, which is urged to the left by a strong-compression spring 61 bearing against the slide 60 and against the holder 13. The slide is supported completely in a guideway 62 formed in the holder 13. Pins 64 secured to the jaws 12 project downwardly into laterally extending slots 65 formed in the slide 60 so that the jaws are carried with the slide 60 when it is moved lengthwise, but are free to move laterally with respect to this direction of movement. A wire spring 66 has bent end portions which project into bores 67 formed in the jaws 12, and constantly urges the jaws apart and into engagement with sloping faces 69 formed on the holder 13. The spring 61 normally urges the slide 60 to the left, as viewed in Fig. 1, with sufficient strength to force the jaws 12 completely together from the camming action of the sloping faces 69 against sloping faces 75 on the jaws 12 (Fig. 5), and when the slide 60 is pushed toward the right, as viewed in Fig. 2, the spring 66 moves the jaws 12 apart to open them.

Each of the jaws 12 is provided with a groove 76 (Fig. 5), the surface of which is roughened by sand blasting, or the like, which is substantially, but not quite, 180° of a circle of the same diameter as the wire 10. Hence, the jaws 12 never quite close when the wire is positioned therebetween while the grooves 76 do conform closely to the periphery of the wire. The jaws 12 are also provided with sharp cutting edges 78 designed to cut flash from a weld, and also have semi-annular relieved portions 79 therein to provide clearance for the flash. The edges 78 are flush with the forward faces of the jaws 12, and parabolic surfaces or nose portions 80 recede from the edges 78 to provide clearance for the flash and to permit the jaws to slide relative to the flash when the jaws are opened.

The jaws 15 are identical in construction with the jaws 12, and also are provided with cutting edges 81, semi-annular relieved portions 82 and parabolic receding surfaces or nose portions 83. The surfaces forming the edges 78 and 81 are at about 80° with respect to one another. That is, each edge is the apex of an 80° angle. The jaws 15 are provided with sloping faces 84 sliding along sloping faces 85 (Fig. 2) of the holder 16. The jaws 15 are constantly urged away from one another by a U-shaped wire spring 86 identical with the spring 66, and pins 88 project into laterally extending slots 89 formed in a hand-actuated slide 90. The slide 90 is urged constantly to the right, as viewed in Fig. 4, by a strong compression spring 92 (Fig. 2) bearing against the end of a bore 91 formed in the slide 90 and the end of a bore 93 formed in the holder 16. The slide 90 is normally urged to the right, as viewed in Fig. 2, to force the jaws 15 completely to the right. When the slide 90 is pressed manually to the left, the jaws are moved to the left relative to the holder 16, and the spring 86 urges the jaws 15 away from one another so that the wire 11 may be threaded through the jaws or pulled from the jaws.

Figure 1:
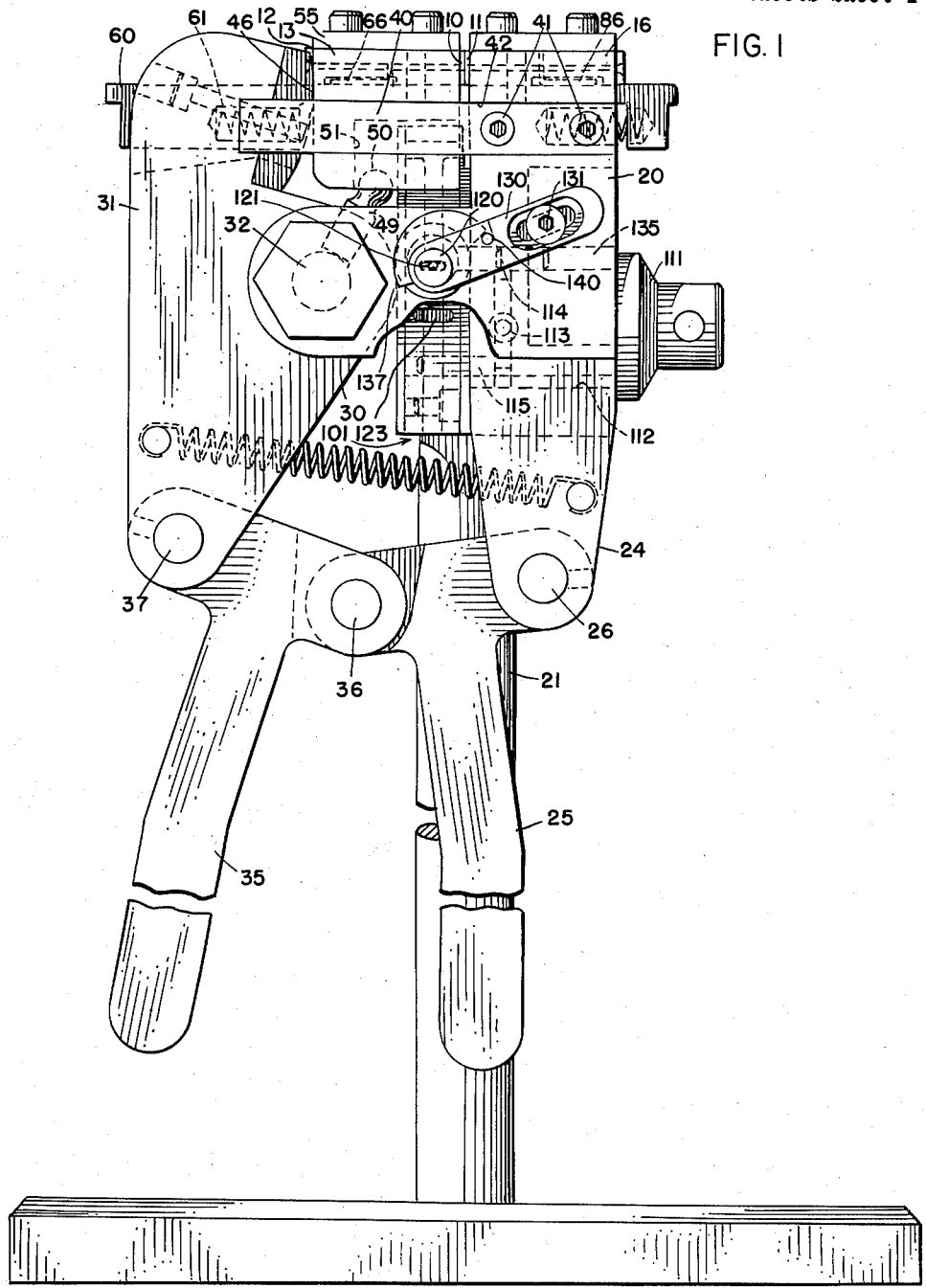
Fig. 1 is a front elevation of an apparatus forming a specific embodiment of the invention.
Figure 2:
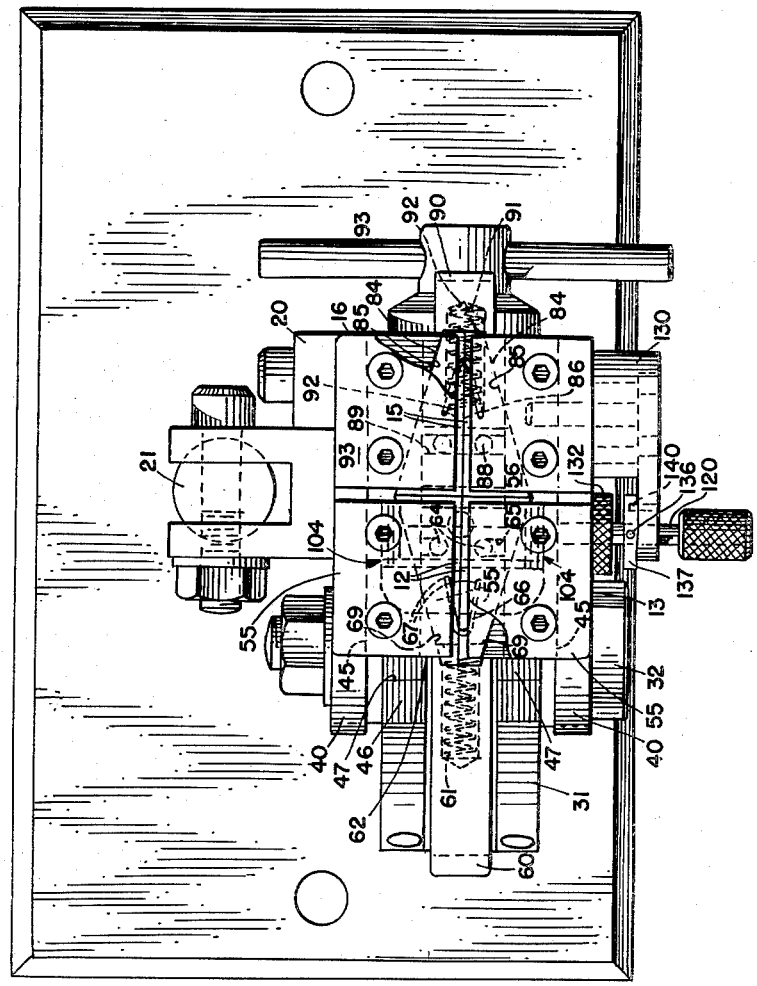
Fig. 2 is a top plan view of the apparatus shown in Fig. 1.

An inner shear 100 (Figs. 3 and 4) is mounted tightly in, but slidably under pressure with respect to, a hollow shell or anvil shear 101 mounted slidably and loosely between a guide surface 102 formed on the frame 20 and a guide 103 mounted pivotally on the pin 32 and closely slidable between surfaces 104 of the arms 30. The play thus provided between the guide surface 102 and the guide 103 permits the shear 101 to be pivoted slightly off vertical to provide clearance for the jaws 15 to release the wire or permit stringing the wire 11 through the jaws 15 when the shear 101 is raised to the same level as the jaws 15. A hand-operated shaft 111 is mounted rotatably in a bore 112 in the frame 20 and is retained therein by a screw 113 projecting into an annular groove 114 formed in the shaft 111 (Fig. 1). A pin 115 mounted eccentrically on the shaft 111 projects from the inner end thereof through latrally extending slots 116 and 117 formed in the outer shear 101 and the inner shear 100, respectively (Fig. 3). With the holder 13 withdrawn as far as possible to the left, as viewed in Fig. 1, the shaft 111 is rotated manually, which rotates the pin 115 to raise the shears 100 and 101, the shear 101 being raised at this time merely by friction between it and the shear 100. This is continued until the tops of the shears 100 and 101 are brought not quite but almost to the level of the grooves in the jaws 12 and 15, and then the operator presses a shaft 120 toward the right, as viewed in Fig. 3, to press a pin 121 secured eccentrically to the shaft 120 into a laterally extending slot 123 formed in the shear 101, and the shaft 111 then is turned further to raise the inner shear 100 while the shear 100 is held against movement therewith by the pin 121, the greater width of the slot 116 than that of the slot 117 permitting such movement to occur between the two shears.

The shaft 120 with the eccentric pin 121 (Fig. 4) is mounted slidably and rotatably in a slotted arm 130 secured adjustably to the frame 20 by a cap screw 131, and also is slidably and rotatably mounted in an eccentric bushing 132 mounted in the arm 30 and secured therein in any desired adjusted position by a set screw 135 (Fig. 3). A semi-circular stop collar 137, which is secured adjustably to the shaft 120 by a set screw 136, and a stop pin 140 permit the shaft 120 to be rotated approximately 180° between a position in which the pin 121 is in its lowermost position and a second position in which the pin 121 is in its uppermost position. The pin 140 projects from the arm 130, and serves to limit the movement of the collar 137 which is fixed to the shaft 120 between these positions of the pin 121. The shaft 120 may be rotated to raise the pin 121 from its lowermost position to its uppermost position to raise semi-cylindrical grooves 145 formed therein to the level of the grooves in the jaws 12 and 15, the position of the eccentric bushing 132 having been set to assure this when the collar 137 is in engagement with the pin 121. Sharpenable shearing edges 149 are formed at the upper edges of a pair of slots 150 formed in the inner shear 100, and shearing edges 151 are formed on the anvil shear 101 to shear the wires completely transversely to the longitudinal axis of the wires to provide a clean, unoxidized surface. The slots 150 extend into a discharge cavity 155 projecting through the bottom of the inner shear 100, and an opening 156 at the top of the shear 100 is provided to observe how far the wires are projected into the shear 100 when the wires are strung up in the apparatus.

Operation

With the levers 25 and 35 moved apart to locate the holder 13 in its furthermost position away from the holder 16, the shaft 120 is pulled to the left, as viewed in Fig. 3, to retract the pin 121, and the shaft 111 is turned to raise the inner shear 100 and the anvil shear 101 through the pin 115 projecting into the slots 116 and 117 until the anvil shear 101 is raised almost to the level of the grooves 76 and 79 in the jaws 12 and 15 (Fig. 4). At this point, the shaft 120 is pushed to the right, as viewed in Fig. 3, to push the pin 121 into the slot 123 (Fig. 4) in the anvil shear 101 to hold the anvil shear 101 at this elevation. The shaft 111 then is turned further to raise the inner shear 100 relative to the anvil 101, the slot 117 (Fig. 3) permitting such movement between the inner shear and the anvil to position the slots 150 in alignment with the grooves 76 and 79 in the jaws. The slides 60 and 90 then are actuated individually, and the wires 10 and 11 are pushed through the grooves 76 and 79 until they project through the slots 150 in the shear 100.

The shaft 120 then is turned in a clockwise direction, as viewed in Fig. 4, until the stop collar 137 engages the pin 140. This turns the eccentric pin 121 to raise the anvil 101 to a position in which the shearing edges 149 are against and support the wires 10 and 11. Then the levers 25 and 35 are pressed toward one another to force the ends of the jaws 12 and 15 hard against the anvil 101, which cams the jaws into very tight gripping engagement with the wires 10 and 11, and the ends of the jaws engage the anvil 101 flush. The shaft 111 then is rotated manually in a clockwise direction, as viewed in Fig. 3, to lower the inner shear 100 relative to the anvil 101, the anvil 101 being held in its elevated position by the pin 121, and the wires 10 and 11 are sheared making clean, transverse cuts at points thereon projecting from the jaws 12 and 15, respectively, distances equal to the thickness of the walls of the anvil having the shearing edges 149 formed thereon, which distance for best results should be between about one-quarter of the diameter of the wires and about one diameter of the wires. The end portions of the wires 10 and 11 sheared therefrom drop through the discharge cavity 155 out of the shear 100 to a suitable receptacle positioned below the standard 21.

The levers 25 and 35 then are moved slightly apart to release the anvil 101, the shaft 120 is pulled to the left, as viewed in Fig. 3, to draw the pin 121 from the slot 123, and the shaft 111 is rotated in a counterclockwise direction, as viewed in Fig. 3, to move the anvil 101 and the shear 100 down out of the path of the jaws 12 and the holder 13. The levers 25 and 35 then are pressed together to force the portions of the wires 10 and 11, projecting beyond the jaws 12 and 15, tightly together to form a very tenacious high tensile strength weld, after which the levers 25 and 35 are moved apart manually, the jaws 12 and 15 permitting sliding movement between the wires and the jaws, and the slides 60 and 90 and are sequentially pressed to open the jaws 12 and 15 very wide through the action of the springs 61 and 87. Since only the springs 66 and 86 urge the pairs of jaws apart, the nose portions of the jaws are readily slid out of the flash before opening so that damage to the weld is prevented. The rounded nose portions 80 and 83 also aid in extracting the nose portions from the flash since they are cammed out of the flash as the jaws tend to open and have no corners to catch on the flash. The wires 10 and 11 welded together then are lifted out of the apparatus between the open jaws 12 and 15 after which the above-described procedure may be repeated.

The sharp edges 79 sever the upset metal substantially completely as the jaws are forced together during the welding process, leaving only a thin film which may be easily broken by flexing, and the jaws size the portions of the wire being welded and under high compression. Since the parabolic surfaces 80 recede from the sharp edges, the upset metal is continuously wedged outwardly and the edges 79 of the jaws 12 and 15 come almost into contact with one another to place the metal being joined under tremendous pressure.

The inner shear 100 may be sharpened by grinding faces 165 away, and separating the halves of the shear 100 by a shim equal in thickness to the thickness of the shear halves ground away by the sharpening. The outer shear may be sharpened by grinding the grooves 151 down further, and resetting the eccentric bushing 132.

The above-described apparatus serves to rapidly prepare wires for coldwelding, the entire operation being capable of completion within a fraction of a minute. The flash is removed from the weld merely by flexing it, the nose portions 78 and 81 of the jaws 12 and 15 serving to substantially shear off the flash as the jaws 12 and 15 are pressed together. The resulting welds are as strong as the remaining portions of the wires are.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In combination with a wire-working apparatus including a first grooved clamping means for gripping a first wire within the groove, a second grooved clamping means for gripping a second wire within the groove, and a frame mounting the first and the second clamping means in spaced apart opposed positions with the grooves of each in coaxial alignment; an improved apparatus for shearing a pair of wires, which comprises a hollow shell open at one end slidably supported within the frame for movement into and out of the space between the clamping means, the open end of the shell having aligned grooves formed on opposite sides thereof forming cutting edges at the inner ends of the grooves, a hollow shear slidably mounted within the shell having an elongated slot formed through each of a pair of opposite walls, the outer edges of the slots forming knife edges for cooperation with the cutting edges of the shell grooves, the elongated slots being arranged for overlapping alignment with the grooves of the shell when the shell and shear are moved to wire-loading positions such that a wire held by each clamping means may easily be inserted over an associated one of the grooves and through an associated one of the slots into the hollow interior of the shear, means affixed to the frame for moving the shell and the shear from retracted positions outside the space between the clamping means to the wire loading positions in the space between the clamping means, the shell having an opening formed in one wall, a bushing mounted adjustably in the frame, a shaft having an eccentric pin on the end thereof mounted rotatably and slidably in the bushing and engageable with the sides of the opening in the shell to move the shell relative to the frame and the shear to a shearing position such that the grooves of the shell are aligned with the grooves of the clamping means and the cutting edges of the grooves are against and support the wires closely between the cutting edges of the slots and the cutting edges of the grooves for a shearing operation, means for limiting rotative movement of the shaft between two positions whereby the shell first is moved and held in the wire loading position and subsequently is adjusted to the shearing position by alignment of the grooves of the shell with the grooves of the clamping means, and means for moving the shear relative to the shell to sever the wires, the cut ends of which then pass through the hollow interior of the shear.

2. In combination with a wire-working apparatus including a first grooved clamping means for gripping a first wire within the groove, a second grooved clamping means for gripping a second wire within the groove, and a frame mounting the first and the second clamping means in spaced apart opposed positions with the grooves of each in coaxial alignment; an improved apparatus for shearing a pair of wires, which comprises a hollow rectangular shell open at an upper end slidably supported within the frame for vertical movement into and out of the space between the clamping means, the upper end of the shell having aligned grooves formed on opposite sides thereof forming cutting edges at the lower inner ends of the grooves, a hollow shear of rectangular outline slidably mounted for vertical movement within the shell end having an elongated slot coplanar with the grooves formed through each of a pair of opposite walls, the upper outer edges of the slots forming knife edges for cooperation with the cutting edges of the shell grooves, means affixed to the frame for moving the shell and the shear from retracted positions outside the space between the clamping means to wire loading positions in the space between the clamping means, in which position the upper edges of the slots are considerably above the lower edges of the grooves so as to define closed apertures such that a pair of wires to be cut may easily be inserted from opposite sides of the shell over the grooves and through the slots into the hollow interior of the shear, at which time the clamping means are actuated to grip the wires, the shell having an opening formed in one wall, a bushing mounted adjustably in the frame, a shaft having an eccentric pin on the end thereof mounted rotatably and slidably in the bushing and engageable with the sides of the opening in the shell to move the shell upward relative to the frame and the shear to a shearing position such that the grooves of the shell are aligned with the grooves of the clamping means and the cutting edges of the grooves are against and support the wires closely between the cutting edges of the slots and the cutting edges of the grooves for a shearing operation, means for limiting rotative movement of the shaft between two positions whereby the shell first is moved and held in the wire loading position and subsequently is adjusted to the shearing position by alignment of the grooves of the shell with the grooves of the clamping means, means for moving the shear downward relative to the shell to sever the wires, the cut ends of which then pass downward through the hollow interior of the shear out of the shearing apparatus and guide means pivotally secured to the frame for guiding the shell into the space between the clamping means and for rocking the shell between the clamping means.

3. Apparatus for shearing off the ends of a pair of wires, which comprises a frame; a hollow shell mounted for sliding vertical movement within said frame and having a pair of aligned cutting grooves formed in the upper surfaces of opposite walls thereof defining cutting edges at the lower inner edges of the grooves; a hollow shear fitting closely within said shell for sliding vertical movement therewithin, said shell being likewise slidable vertically about said shear, said shear having a pair of elongated slots formed through opposite walls thereof which slots are coplanar with the grooves of said shell and have cutting edges defined at the upper inner edges thereof; means for positioning said shear with respect to said shell in a loading position where the upper edges of the slots are considerably above the lower edges of the grooves so that a pair of closed apertures are defined by the adjacent grooves and slots into which a pair of wires to be cut are easily inserted from opposite sides of said shell over the grooves and through the slots into the hollow interior of said shear; means operated after the wires have been inserted for elevating said shell with respect to said shear and said frame through a predetermined distance slightly less than the distance between the upper edges of the slots and the lower edges of the grooves at the loading position to a shearing position wherein the cutting edges of the grooves support the wires closely between the cutting edges of the slots and the cutting edges of the grooves; and means operated after said shell has been elevated to the shearing position for moving said shear downward with respect to said shell so that the cutting edges of the slots pass the cutting edges of the grooves and the cutting edges co-operate to sever the wires, the cut ends of which then pass downward through the hollow interior of said shear out of the shearing apparatus.

References Cited in the file of this patent

UNITED STATES PATENTS

| | | |
|---|---|---|
| 338,396 | Fitts | Mar. 23, 1886 |
| 415,621 | Collins | Nov. 19, 1889 |
| 555,638 | Cobb | Mar. 3, 1896 |
| 2,516,602 | Snyder | July 25, 1950 |
| 2,644,520 | Nelson | July 7, 1953 |
| 2,728,391 | Peddinghams et al. | Dec. 27, 1955 |
| 2,814,343 | Anderson | Nov. 26, 1957 |